United States Patent
Levitov (10) Patent No.: US 11,461,448 B2
(45) Date of Patent: Oct. 4, 2022

(54) MOTION-TRIGGERED BIOMETRIC SYSTEM FOR ACCESS CONTROL

(71) Applicant: Yevgeny Levitov, San Antonio, TX (US)

(72) Inventor: Yevgeny Levitov, San Antonio, TX (US)

(*) Notice: Subject to any disclaimer, the term of this patent is extended or adjusted under 35 U.S.C. 154(b) by 0 days.

(21) Appl. No.: 17/164,291

(22) Filed: Feb. 1, 2021

(65) Prior Publication Data

US 2021/0224369 A1    Jul. 22, 2021

Related U.S. Application Data

(63) Continuation-in-part of application No. 15/213,015, filed on Jul. 18, 2016.

(51) Int. Cl.
*G06F 21/32* (2013.01)
*G06V 40/40* (2022.01)
*G06V 40/16* (2022.01)

(52) U.S. Cl.
CPC ...... *G06F 21/32* (2013.01); *G06F 2221/2133* (2013.01); *G06V 40/166* (2022.01); *G06V 40/167* (2022.01); *G06V 40/45* (2022.01)

(58) Field of Classification Search
None
See application file for complete search history.

(56) References Cited

U.S. PATENT DOCUMENTS

| | | | | |
|---|---|---|---|---|
| 8,261,090 B1* | 9/2012 | Matsuoka | | G06F 21/32 |
| | | | | 713/186 |
| 8,994,499 B2* | 3/2015 | Zhao | | H04W 12/06 |
| | | | | 340/5.83 |
| 9,202,105 B1* | 12/2015 | Wang | | G06F 21/32 |
| 9,251,401 B1* | 2/2016 | Koo | | G06K 9/00288 |
| 9,875,349 B2* | 1/2018 | Zhao | | H04W 12/06 |
| 10,002,297 B2* | 6/2018 | Sengupta | | G06K 9/00771 |
| 2001/0031072 A1* | 10/2001 | Dobashi | | G07C 9/253 |
| | | | | 382/118 |
| 2002/0097145 A1* | 7/2002 | Tumey | | B60R 25/04 |
| | | | | 340/426.28 |
| 2009/0315869 A1* | 12/2009 | Sugihara | | G06F 1/1605 |
| | | | | 345/204 |
| 2010/0186084 A1* | 7/2010 | Hamid | | G06F 12/1458 |
| | | | | 726/19 |
| 2011/0205148 A1* | 8/2011 | Corriveau | | G06F 3/013 |
| | | | | 345/156 |
| 2011/0314530 A1* | 12/2011 | Donaldson | | H04L 9/3271 |
| | | | | 726/7 |
| 2012/0232991 A1* | 9/2012 | Zealer | | G06Q 30/00 |
| | | | | 705/14.55 |
| 2013/0208103 A1* | 8/2013 | Sands | | H04N 21/4415 |
| | | | | 348/78 |
| 2013/0249669 A1* | 9/2013 | Zwiener | | B60R 25/2054 |
| | | | | 340/5.53 |

(Continued)

*Primary Examiner* — Kenny S Lin
(74) *Attorney, Agent, or Firm* — Larisa Migachyov (57) ABSTRACT

A system and method for regulating access to a computing device, wherein a motion detector detects motion near the computing device and triggers an imaging device to receive an image, which is then analyzed to identify any people in the image. If at least one person in the image is not an authorized user, the computing device is locked or disconnected from the Internet.

5 Claims, 11 Drawing Sheets

(56) References Cited

U.S. PATENT DOCUMENTS

| | | | |
|---|---|---|---|
| 2014/0026188 A1* | 1/2014 | Gubler | H04W 12/12 |
| | | | 726/3 |
| 2014/0123273 A1* | 5/2014 | Matus | G06F 21/30 |
| | | | 726/17 |
| 2014/0147020 A1* | 5/2014 | Baldwin | H04N 21/4223 |
| | | | 382/118 |

* cited by examiner

MOTION-TRIGGERED BIOMETRIC SYSTEM FOR ACCESS CONTROL

CROSS-REFERENCE TO RELATED APPLICATIONS

The present application is a continuation in part of application Ser. No. 15/213,015, filed Jul. 18, 2016, which is a continuation of application Ser. No. 14/547,135, filed Nov. 19, 2014, which takes priority from Provisional Application No. 61/907,383, filed Nov. 21, 2013, which is herein incorporated by reference.

BACKGROUND

Restricting access to a computer system to authorized users is an important and serious problem. Passwords are most commonly used, but they are highly vulnerable to hacking. Physical objects such as cards or keys can be lost or stolen and used by an unauthorized user. For these reasons, many computers, smartphones, and similar devices now use biometrics to identify authorized users. Such biometric access control devices may use fingerprints, face or voice identification, or even heartbeat.

One other advantage of biometric access control systems is that they are more invisible to the user than a password or key. Instead of entering a complicated password or using a key, the user's face or any other biometric parameter may be identified without the need for the user to take any sort of action.

This renders biometric access control systems advantageous in highly sensitive applications where security is paramount. If a user has to lock a computer every time they step away from the machine, and then unlock it every time they come back, it is highly likely that they will leave the computer unlocked and unattended at least once. If the locking and unlocking happens automatically without any need for intervention by the user, the security of the system will be much improved.

U.S. Pat. No. 6,111,517 to Atick et al. describes a system where the biometric identification is continuous—the computer continuously identifies the user's face as the user uses the computer, and locks the computer when the user steps away from the machine or is replaced by a different user. While this is optimal for maintaining proper computer security, the reason that such systems are not yet in wider use is that they are very resource-intensive. Face recognition is a complex and difficult task, involving a lot of complicated calculations; other biometric recognition systems, such as iris recognition, are equally difficult. The Atick system has to continuously monitor the camera's field of vision to be able to detect unauthorized users. This takes up computer resources that could otherwise be used for the computer's normal applications. Also, the resource-intensive nature of the system means that it cannot be used on less-powerful computing devices such as smartphones, or built into a video camera.

One other issue associated with existing biometric facial-recognition systems, or other systems that solely rely on visual information, is that they are easy to fool by holding a photo of an authorized user in front of the camera.

Finally, many biometric systems rely on fingerprints or other actions that require touching, which can transmit disease from user to user.

A need therefore exists for a continuous biometric identification system that is less resource-intensive than prior art systems, that is touch-free, that does not require to be running continuously in order to be effective, and that can tell the difference between a photo of a user and a real living user.

SUMMARY OF THE INVENTION

Therefore, the object of the present invention is to provide a system and method for automatically locking or unlocking a computer system, smartphone, tablet, or any other computing device, by performing a biometric identification of any people in front of the camera only when motion is detected in front of the camera.

Another object of the present invention is to provide a touch-free system and method for locking and unlocking a computing device, to avoid disease transmission.

Another object of the present invention is to provide a system for continuous biometric user identification that uses minimal computer resources to run.

Another object of the present invention is to provide a system for determining whether a face or iris in front of the computing device is a living user or a photo of a user.

Another object of the present invention is to provide a system for continuous biometric user identification that is only triggered when motion is detected in the field of view.

Another object of the present invention is to provide a method of electronic authentication of a document using biometrics.

For purposes of the present disclosure, a "computing device" is any computer, netbook, smartphone, tablet, e-reading device, mobile terminal, or other device that may require access to be limited to authorized users.

The system of the present invention regulates access to a computing device using a motion detector, an image capturing device, a face detection module, a liveness detection module, and a biometric analyzer. All of these elements except for the motion detector are deactivated until they are triggered, and deactivate immediately after performing their respective functions. The motion detector triggers the image capturing device when it detects motion. The image capturing device captures an image of the area in front of the computing device, triggers the face detection module, and deactivates. The face detection module analyzes the image to determine if any faces are present, triggers the liveness detection module if any faces are present, and deactivates (if no faces are present, the liveness detection module is not triggered). The liveness detection module determines if the faces in the image are alive, triggers the biometric detection module if at least one living face is present, and deactivates (if no living faces are present, the biometric detection module is not triggered). The biometric detection module identifies any living faces present in the image and unlocks the computing device if all the people identified are authorized users. If any person identified by the biometric detection module is not an authorized user, the computing device is locked, or remains locked.

In an embodiment, in addition to locking the computing device, the system may also disconnect it from the Internet or from a local network. The system may also disconnect any peripherals such as a keyboard, a mouse, or a USB port.

The biometric analysis may be facial analysis, retinal scan analysis, or any other analysis that is capable of identifying a person from an image.

The face detection may be performed by using the eigenvector method.

The liveness detection may be performed by micromovement analysis, infrared sensing, or both.

DETAILED DESCRIPTION OF THE PREFERRED EMBODIMENT

Figure 1:
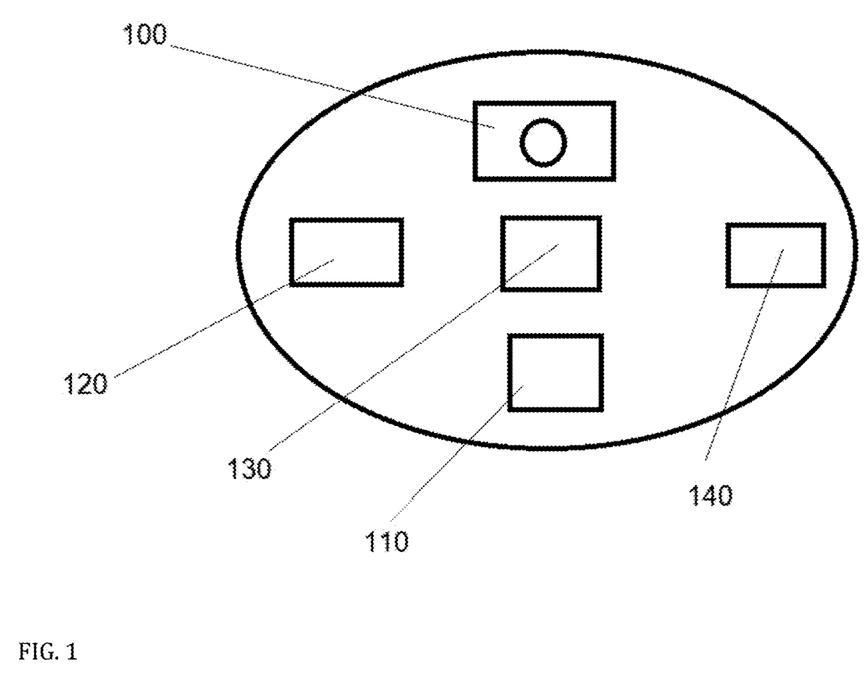
FIG. 1 shows an embodiment of the system of the present invention.

In its preferred embodiment, the system of the present invention comprises an imaging device 100, a motion detection module 110, a face detection module 120, a liveness detection module 130, and a biometric identification module 140, as shown in FIG. 1. The face detection module, liveness detection module, and biometric identification module may be wholly or in part implemented as software on the processor of the computing device; in another embodiment, the motion detection module, imaging device, face detection module, liveness detection module, and biometric identification module may all be parts of a separate device distinct from the computing device.

The imaging device is preferably a camera, but may also be a retina scanning device or any other imaging device that can be used to acquire images used for biometric identification, and to acquire them passively without active user involvement. The imaging device is preferably aimed in such a way as to capture images of the area in front of the computing device, where a user would be located when using a computing device, and focused in such a way as to capture sharp, focused images at the distance at which a user is typically located when using the computing device.

In an embodiment, the built-in camera of the computing device may be used as the imaging device. In another embodiment, a separate camera may be used as the imaging device. The minimum parameters required of such a camera are preferably a still-image resolution of 3.0 megapixels or higher, video capture of 1280×720 pixels for lifelike detail and motion, and a VGA image sensor with RightLight technology or a similar technology, to provide sharp images even in dim light. The camera preferably has a USB 2.0 or higher connectivity.

The motion detection module may be a separate device from the camera, to avoid the excess power consumption and processing burden associated with continuous camera activation. In that aspect of the invention, the motion sensor may be an infrared sensor or a low-resolution camera or any other commercially available motion sensor.

In an embodiment, the motion detection module is part of the imaging device itself, and software is used to detect motion. In that embodiment, the only software module that is continuously active is the motion detection module.

When the motion detector detects motion, the imaging device is triggered to take an image. The imaging device is then immediately deactivated to conserve resources. If no motion is detected, the imaging device stays deactivated and all the other modules of the present invention are also deactivated. The period of time between taking the image and deactivation may be less than 1 millisecond, between 1 millisecond and ½ second, or between ½ second and 1 second.

After the imaging device takes an image, it is then transmitted to the face detection module. The face detection module may be implemented as a software program running on the processor of the computing device, or as a software program running on a separate processor. The face detection module is configured to analyze an image to determine whether or not a face is present in that image. If a face is present, the liveness detection module is then triggered to determine whether or not the face is alive (as opposed to being a photograph or a model). If no face is present, the face detection module is deactivated and the system is inactive until the next time the motion detector detects motion. If a face is present, the face detection module is deactivated after the image is analyzed. The period of time between analysis completion and deactivation may be less than 1 millisecond, between 1 millisecond and ½ second, or between ½ second and 1 second.

The face detection module preferably uses pattern recognition methods to determine whether a face is present in an image. Some of these pattern recognition methods are known as eigenvectors face recognition technology where the neural networks are used to recognize the face through learning correct classification of the coefficients calculated by the eigenface algorithm. The network is first trained on the pictures from the face database, and then it is used to identify the face pictures given to it. Other pattern recognition methods may also be used, such as local binary patterns histograms, three-dimensional recognition, linear discriminant analysis, elastic bunch graph matching using the FisherFace algorithm, the hidden Markov model, multilinear subspace learning using tensor representation, and neuronal motivated dynamic link matching. It is to be understood that any other face recognition method may also be used to practice the present invention, and that it is not limited to any of the above described or below described methods.

In an embodiment, the face detection module uses the "eigenface" method to determine whether or not a face is present in the image. To perform the method, a training set of face images is first provided; the pictures constituting the training set are normalized to have the eyes and mouths aligned, resampled to a common pixel resolution, and taken under the same lighting conditions. Each image is treated as one vector, and all the images are stored as a single matrix T. The average image a is then calculated and subtracted from each original image in T. Then, the eigenvectors and eigenvalues of the covariance matrix S are calculated. Each eigenvector has the same dimensionality as the original images and can itself be seen as an image. The image taken by the imaging device is then projected onto the collection of eigenvectors, and if the image is similar to one or more of the "eigenfaces", it is considered to contain a face. Eigenfaces are eigenvectors of covariance matrix, representing given image space. Any new face image can then be represented as a linear combination of these Eigenfaces. This makes it easier to match any two given images and thus perform a face recognition process.

In an alternate embodiment, other face detection methods are used, such as "fisherfaces", which uses linear discriminant analysis, or the active appearance model, which uses an active shape model to describe the outline of a face. Principal component analysis is then used to form a basis set of models that encapsulate the variation of different faces.

If the face detection module detects an image of a face, the liveness detection module is triggered next. The liveness detection module is intended to distinguish between a living face and a photograph of a face, to prevent an unauthorized user from gaining access to the computing device by using a photograph or 3D model of the face of an authorized user.

In the preferred embodiment, as illustrated in FIG. 1, the liveness detection module uses a two-step process to determine whether or not the face in the image is a living face. The first step is infrared face detection (determining whether the face is emitting infrared radiation). The second step is detection of micromovements of the face. Both steps will be discussed in greater detail hereinbelow. In alternate embodiments, only one of these steps may be used.

The liveness detection module may perform infrared face detection to determine whether or not the face in the image is emitting infrared radiation. This is preferably done by an infrared sensor. For living human faces, the temperature of the face generally stays within a narrow range from approximately 35.5° C. to approximately 37.5° C. Detecting this temperature will help the liveness detection module determine that the face in front of it is a living face and not a still photograph. It will be noted that the infrared sensor, in this embodiment, is only used for temperature determination and not for facial identification; in the preferred embodiment, the liveness detection module does not take an infrared image of the face—it simply determines the temperature of the face identified by the face detection module. In an alternate embodiment, the liveness detection module does take an infrared image of the face, to provide greater detail about the infrared pattern and greater certainty that the face in front of the computing device is alive. In that embodiment, an infrared pattern that does not match a typical face is rejected and the liveness detection module identifies that the face in front of the computing device is not a living face.

If the infrared face detection identifies a living face, the liveness detection module then performs a micromovement analysis on the face. To do that, the relative movements of various points on the face are analyzed. The imaging device may take a short video recording of the face, or may take at least two images of the face, to determine if any micromovements occur. In an embodiment, the video can be 10-20 frames long, but any length of video may be used for practicing the present invention. After the video or images are taken, the liveness detection module identifies certain key points on the face—for example, eyelids, pupils, nostrils, lips, or any other key points that can move with relation to other points. The movement of each point with respect to the other points is then analyzed. If there is no relative movement of key points with respect to each other, it is likely that the face is not alive. A living face is likely to have relative movement of key points with respect to each other—for example, the eyelids may move, the pupils may move, the lips may move, or the entire face may shift position and slightly turn, changing the relative position of the key points. If no micromovements occur, the liveness detection module reports that the face is not alive. If micromovements occur, the liveness detection module reports that the face is alive. After the analysis is performed, the liveness detection module deactivates.

If the liveness detection module does not detect a living face, all the elements shut down except for the motion detector. If it does detect a living face, it triggers the biometric identification module to activate. The biometric identification module then determines whether or not an authorized user is present.

While the preferred embodiment of the invention uses face recognition for biometric identification, this is not the only way in which the biometric identification may be performed. The biometric identification module may use any form of visual biometric identification to identify the user, such as face recognition, iris recognition, or key stroke recognition. The biometric identification module may use the image taken by the imaging device to perform the identification or may trigger the imaging device or a separate imaging device to take an additional image for biometric identification purposes. The biometric identification module is then deactivated until the next time it is triggered.

Once all the people in front of the computing device are identified, the system determines whether or not each person is an authorized user. If all of the persons are authorized users, the computing device is unlocked (or stays unlocked). If at least one person is an unauthorized user, the computing device is locked (or stays locked). The imaging device, the face detection module, the liveness detection module, and the biometric identification module then stay deactivated until the next time that motion is detected.

The system of the present invention can be installed on the computer system or other entity that needs to be secured, a different computer system, or within the imaging device itself. The motion detection module (whether a dedicated module or motion detection software) detects any motion in front of the computing device, and may comprise a dedicated motion sensor such as an infrared sensor or infrared sensing software, or may use the imaging device itself. If no motion is detected, the face detection module, liveness detection module, and biometric identification module are inactive and use no resources, and the computer system stays locked, or unlocked, as the case may be. If motion is detected in front of the imaging device, the imaging device is triggered to receive an image, and the face detection module, liveness detection module, and biometric identification module are activated and identify any person or persons in the image. The imaging device, face detection module, liveness detection module, and biometric identification module are then immediately deactivated after use to conserve resources.

Facial identification is more difficult in field conditions, such as outdoors or on a factory floor, than it is in normal office or home conditions, due to differences in lighting. In an embodiment, the system of the present invention comprises a second camera used to receive infrared images and an infrared emitting device to provide infrared illumination. The infrared camera may also be used for liveness detection in that embodiment of the invention.

The system of the present invention may be implemented as software, using the computing device's built-in camera for both the motion detection and the biometric user recognition; or it may be implemented partially or entirely as hardware, including its own dedicated camera, an optional infrared camera, and dedicated modules for motion detection, face detection, liveness detection, and biometrics built into the camera. In an embodiment, the system of the present invention is implemented as a separate device that comprises all the elements of the system of the present invention—the camera, the motion detection module, the face detection module, the liveness detection module, and the biometric identification module, and a processor that allows these elements to function. In that embodiment, the system of the present invention is connected to a computing device using a USB port; if the USB connection is broken, the computing device locks automatically.

Figure 2:
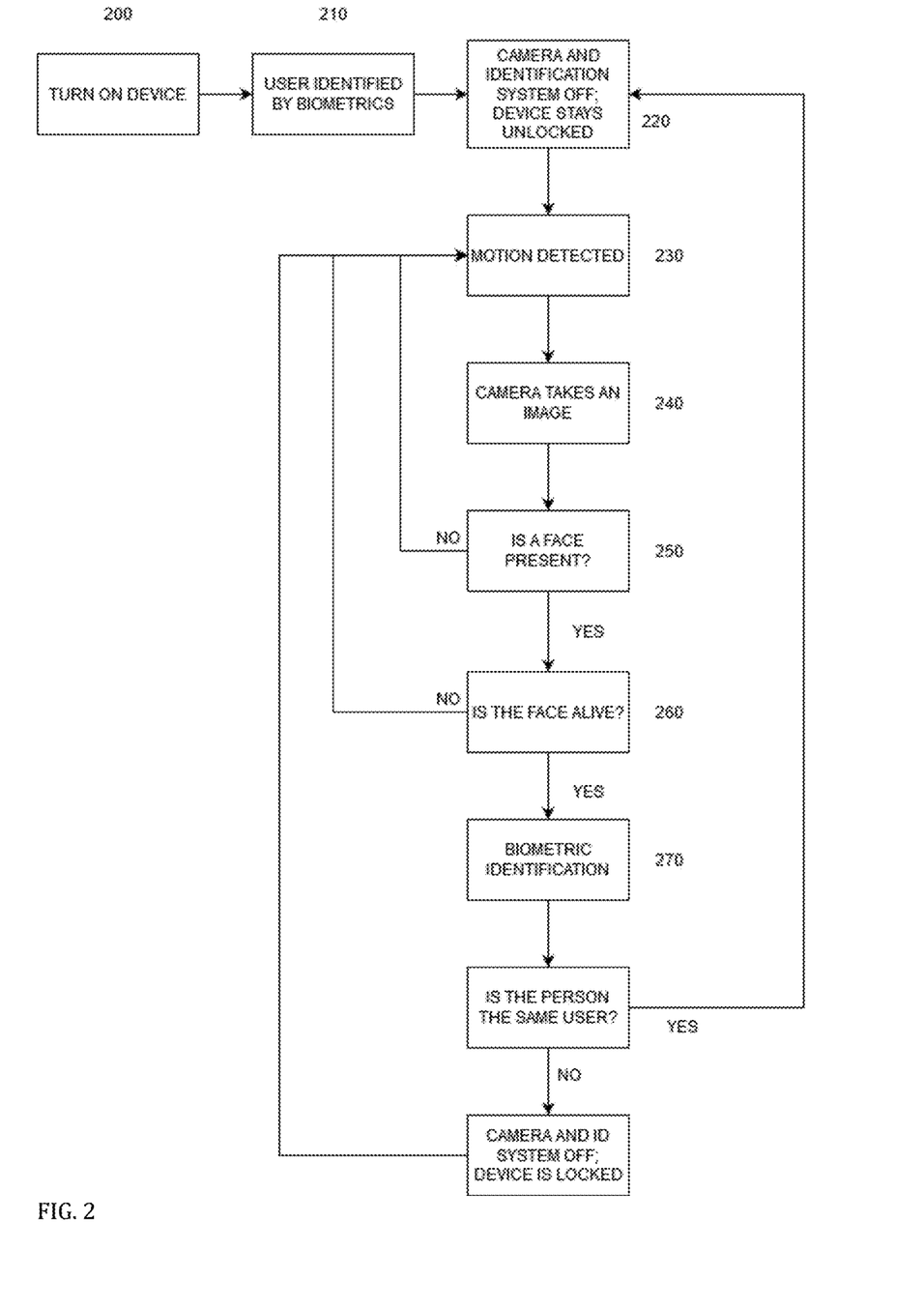
FIG. 2 shows a flowchart for an embodiment of the method of the present invention.
Figure 3A:
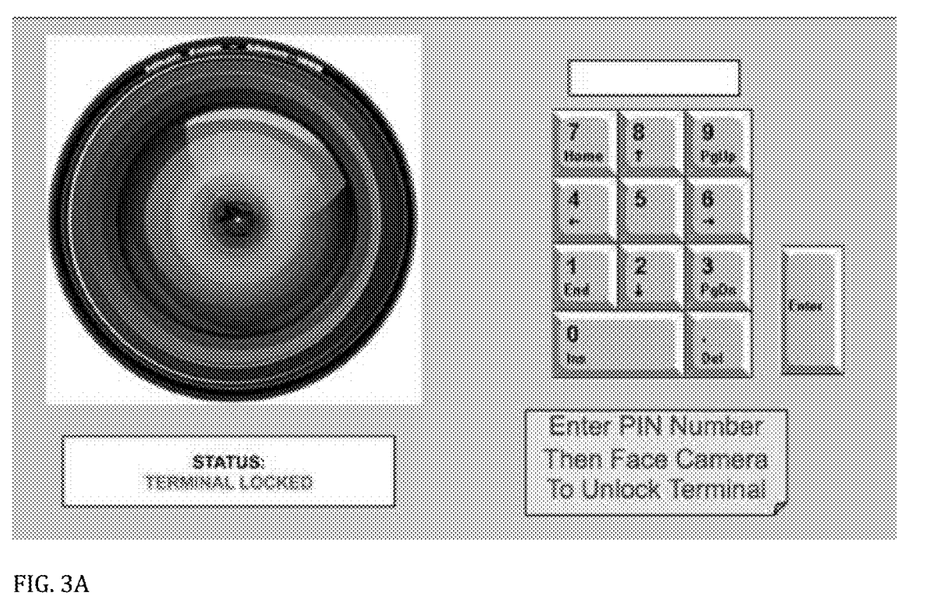
FIG. 3A shows a screenshot of the preferred embodiment of the login screen of the system of the present invention.
Figure 3B:
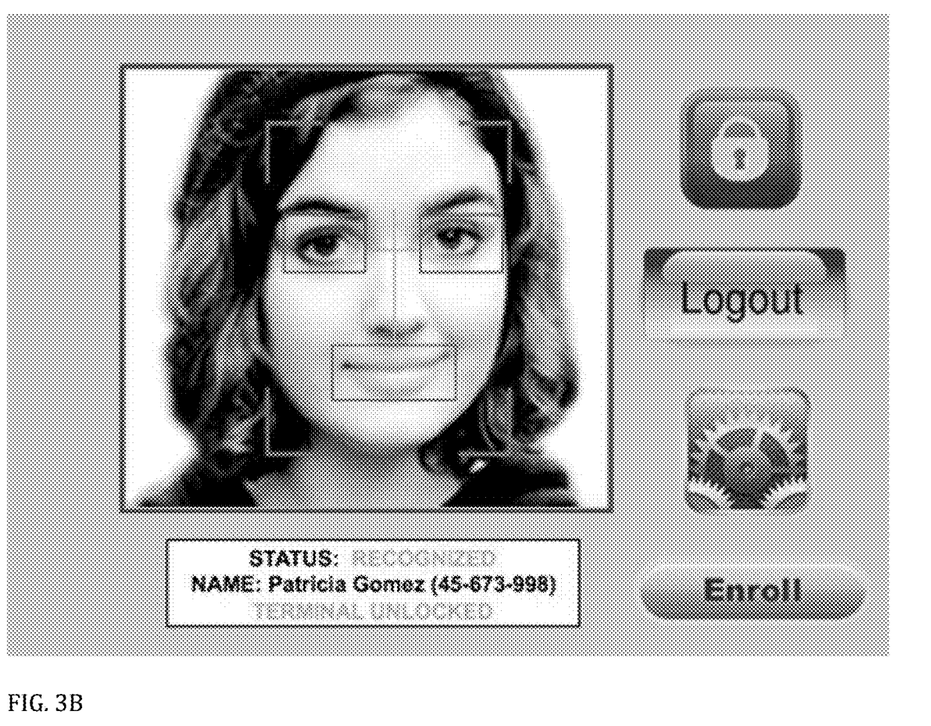
FIG. 3B shows a screenshot of the preferred embodiment of the identification screen of the system of the present invention.

FIG. 2 shows a diagram of the preferred embodiment of the method of the present invention. Initially, the user turns on the computing device 200. FIG. 3A shows a screenshot of the login screen that the user sees when the computing device is turned on, in an embodiment of the present invention. When the computing device is first turned on, the user is identified by means of biometrics 210 and the user's biometric parameters are stored in the computing device or elsewhere. FIG. 3B shows a screenshot of the identification screen showing the user as RECOGNIZED and the terminal as UNLOCKED. The camera and biometric identification system are then turned off, and the computing device stays unlocked 220 until motion is detected in front of the camera, or the selected time interval is reached. The user can then use the computing device without the biometric identification system putting an additional load on its resources.

Figure 3C:
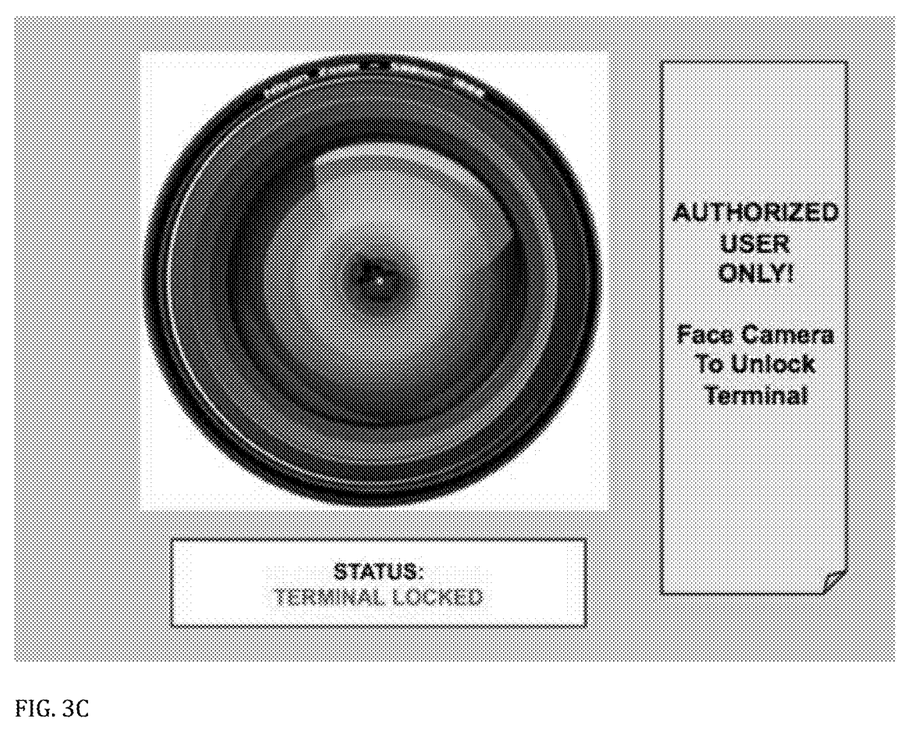
FIG. 3C shows a screenshot of the preferred embodiment of the locked screen of the system of the present invention.

When motion is detected in front of the camera 230, the camera is activated. The camera is triggered to receive at least one image 240, and triggers the face detection module to determine if a face is present in the image 250. The camera then deactivates. If the face detection module determines that a face is present in the image, the liveness detection module is triggered to determine if the face is alive 260. The face detection module then deactivates. If the liveness detection module determines that the face is alive, the biometric identification module is triggered to identify any people in the image 270. If the only person in the image is the user whose biometric parameters are stored in the computing device (i.e. the same person as the person who originally logged into the computer), the computing device remains unlocked. If any other person is detected in the image, the computing device is locked 280. The biometric identification module and the camera are then turned off. The motion detector stays turned on. FIG. 3C shows a screenshot of the locked screen of the preferred embodiment of the present invention.

If the computing device is locked 280, the system waits for motion to be detected in front of the camera. When that happens, the system triggers the camera to receive at least one image, which triggers the face detection module to identify any faces in the image, which triggers the liveness detection module to determine if the faces are alive, which triggers the biometric identification module to identify any people in the image. If the only person in the image is the user who originally logged into the computer, the computing device is unlocked. If any other people are present in the image, the computing device stays locked.

At any point, if a module returns a negative result—i.e. the face detection module does not detect any faces, or the liveness detection module does not detect any living faces— the system is deactivated except for the motion detector and is only triggered again when motion happens in front of the motion detector.

When the user logs off from the computing device, the computing device is locked and the system waits for the next user to log in.

In other embodiments of the method, the computing device may be disconnected from the Internet when it is locked, or may remain unlocked but may be disconnected from the Internet when any person other than the authorized user is present in front of the camera.

In an embodiment of the invention, all or some of the computing device peripherals may be disconnected when the computing device is locked. The peripherals may be input devices, such as a mouse, keyboard, microphone, or read-only memory; output devices, which provide output from the computer, such as a monitor, projector, printer, or speaker; or input/output devices, such as a data storage device, network adapter, or multi-function printer. The peripherals may also include ports such as a USB port for connecting a data storage device to the computer, or a HDMI port for connecting an external monitor. In an embodiment of the invention, all of these peripherals are disconnected when the computing device is locked. This prevents situations in which an unauthorized user connects a flash drive or similar memory module to a locked computing device to gain access or to copy files from the computing device, or gains access to a locked computing device by means of an input device such as a keyboard or mouse. The peripherals are preferably locked by peripheral device management services where the input/output of the peripherals, ports and physical devices can be locked or unlocked. This provides for a seamless and more controllable management of the resources.

Figure 4A:
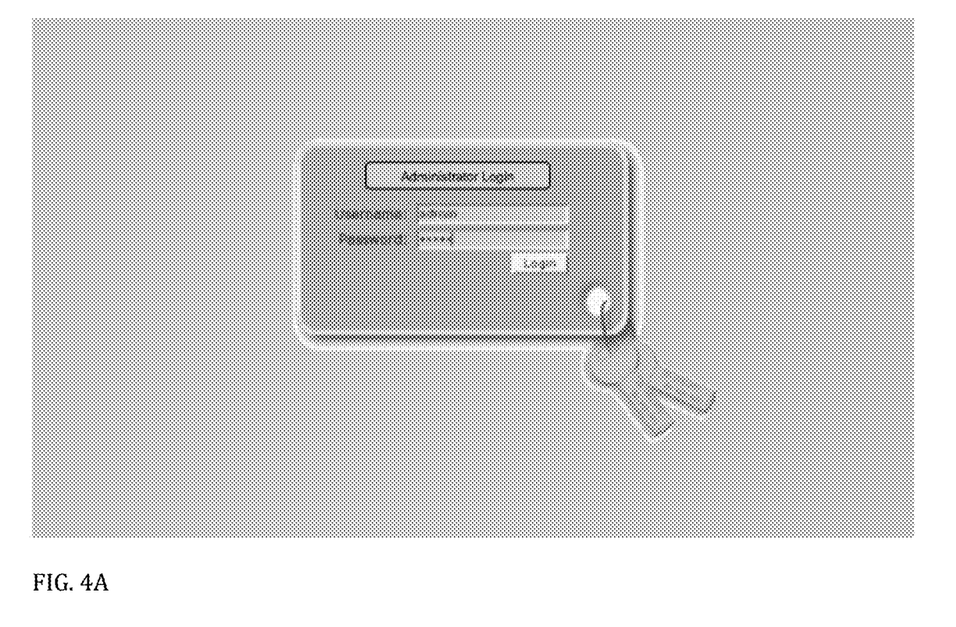
FIG. 4A shows a screenshot of the preferred embodiment of the administrator access screen of the system of the present invention.
Figure 4B:
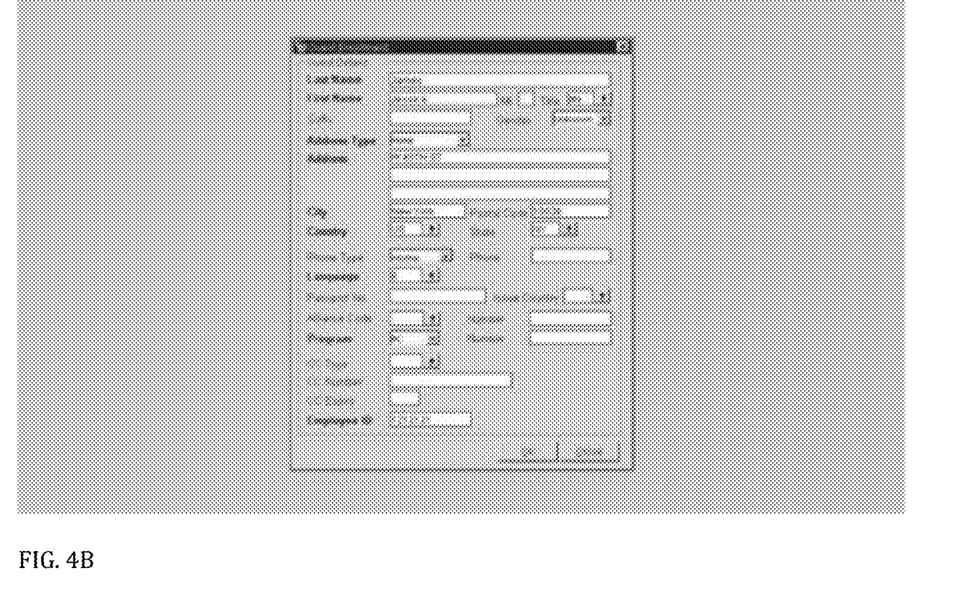
FIG. 4B shows a screenshot of the preferred embodiment of the new user input screen of the system of the present invention.
Figure 4C:
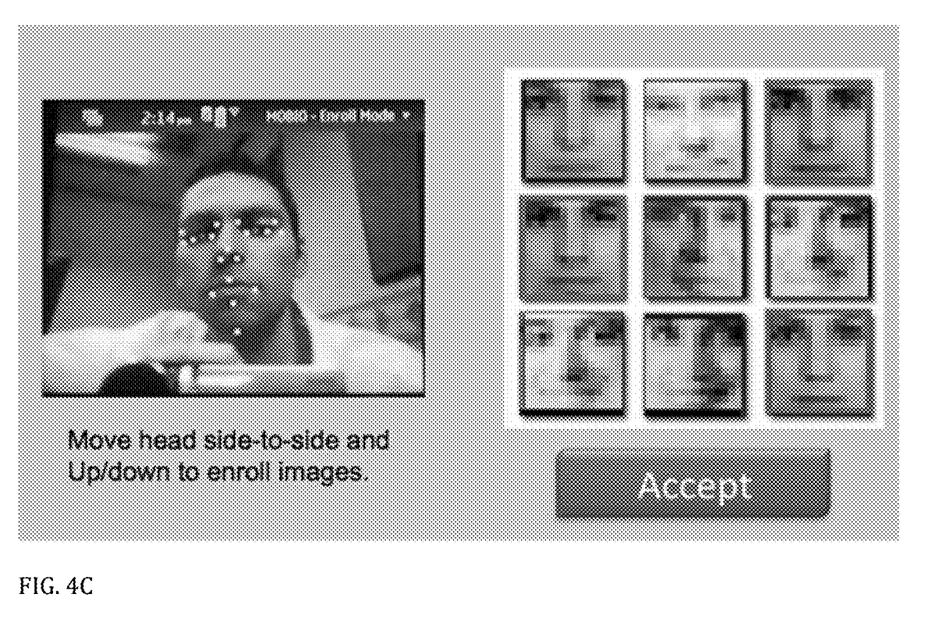
FIG. 4C shows a screenshot of the preferred embodiment of the screen where the new user images are captured and saved of the system of the present invention.

FIGS. 4A-4C show screenshots of the process used to enroll a new user into the system in the preferred embodiment of the present invention. FIG. 4A shows a screen where the administrator enters their username and password prior to getting access to the system. FIG. 4B shows a screen where the administrator enters a new user's information and any personal details required to create an account. FIG. 4C shows a screen where the new user's facial images are captured and saved. As is shown in the screenshot, the user is encouraged to move their head and face from side to side and up/down and to make different facial expressions, and multiple images are preferably taken. Once the desired images are captured and saved, the administrator clicks the "Accept" button to save the images into the authorized user facial library. This facial library is preferably stored on a server connected to the computing device through a secure wired or wireless connection, but may also be stored on the computing device itself.

Figure 5A:
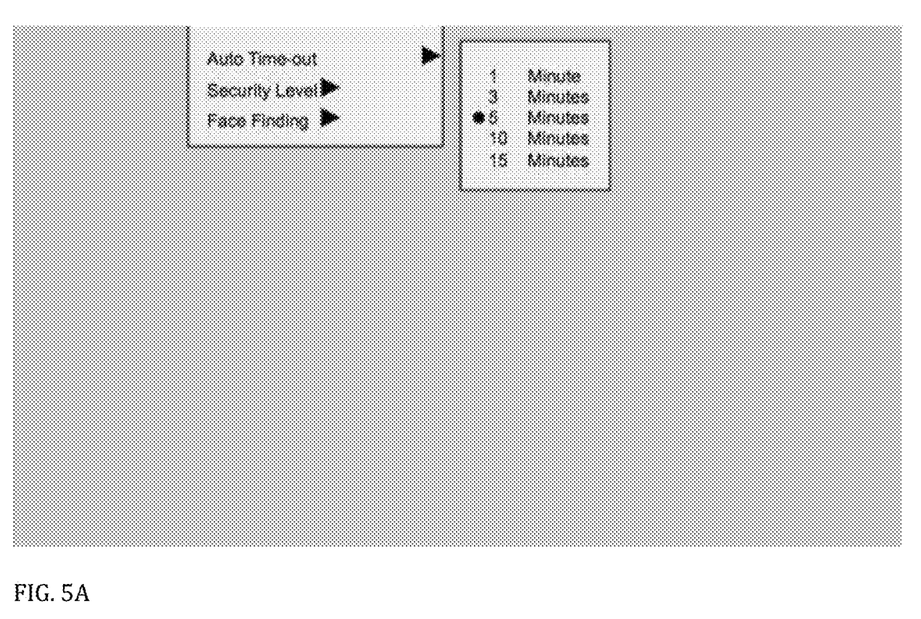
FIG. 5A shows a screenshot of a settings screen in the system of the present invention where the auto time-out period is set.
Figure 5B:
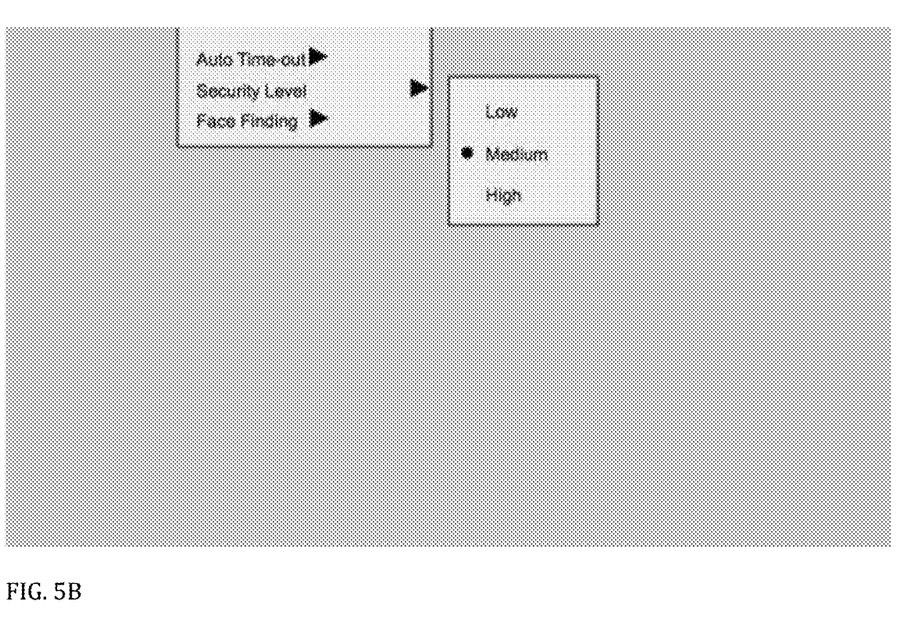
FIG. 5B shows a screenshot of a settings screen in the system of the present invention where the security level setting is set.
Figure 5C:
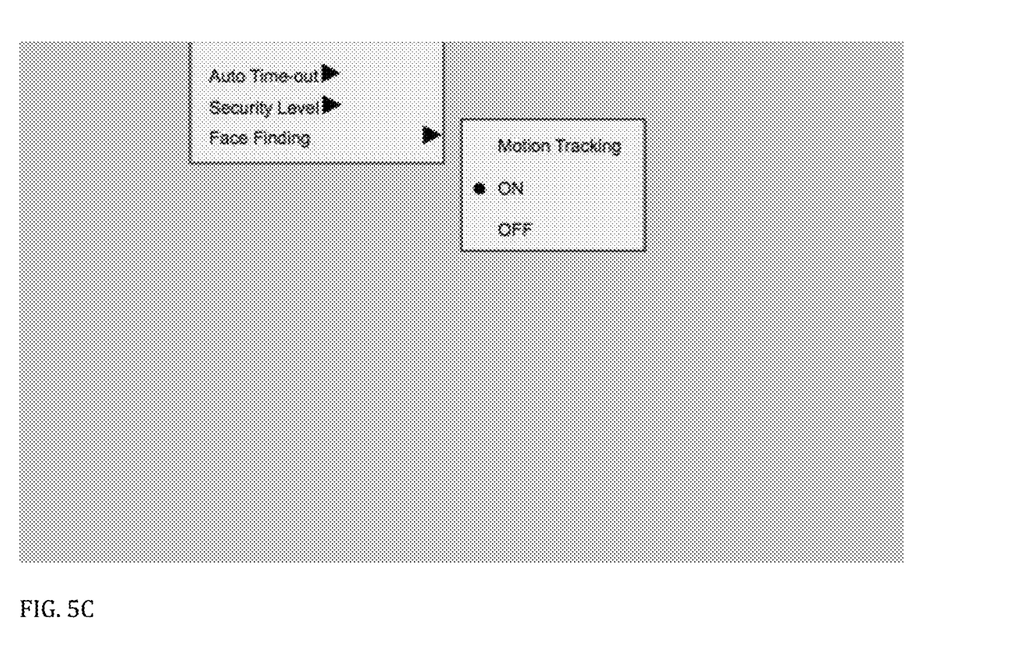
FIG. 5C shows a screenshot of a settings screen in the system of the present invention where motion tracking is turned on or off.

FIGS. 5A-5C show the settings screen in the preferred embodiment of the present invention. A user can set an "auto time-out" period when the computing device automatically locks after a period of inactivity, as shown in FIG. 5A. FIG. 5B shows the security level setting—a user can set a Low, Medium, or High security level. The higher the security level, the more detailed the face-recognition process; this reduces the false-acceptance rate (errors where an unauthorized user is misidentified as an authorized user and granted access), but increases the false-rejection rate (errors where an authorized user is misidentified as an unauthorized user and denied access). FIG. 5C shows the motion tracking screen. A user can turn off motion tracking if motion-detection is not needed for a particular application or time period.

The system and method of the present invention may be implemented on any computing device to which a camera may be connected, or which comprise a camera or any other imaging device. Such computing devices include smartphones, tablets, laptops, netbooks, e-reading devices, desktops, workstations, terminals, and any other devices that require secure access control.

Exemplary embodiments are described above. It will be understood that the invention is not limited to those exemplary embodiments, but is limited only by the appended claims.

The invention claimed is:

1. A touch-free system for regulating access to a computing device, comprising:
    a motion detector;
    an image capturing device, wherein the image capturing device is configured to capture images;
    a face detection module, wherein the face detection module is configured to analyze images captured by the image capturing device, wherein the face detection module is configured to determine if at least one human face is present in an image captured by the image capturing device;
    a liveness detection module, wherein the liveness detection module is configured to determine if a face present in front of the computing device is alive;
    a biometric analyzer, wherein the biometric analyzer is configured to identify any person present in front of the computing device;
    a memory storing a biometric representation of at least one authorized user;
    at least one peripheral device;
    wherein the motion detector operates whether the computing device is locked or unlocked;
    wherein the computing device is locked and the at least one peripheral device is disconnected whenever the biometric analyzer detects that at least one of the people in front of the computing device is not an authorized user;
    wherein the computing device is unlocked and the at least one peripheral device is connected whenever the biometric analyzer detects that all of the people in front of the computing device are authorized users;
    wherein the image capturing device, face detection module, liveness detection module, and biometric analyzer are deactivated until they are triggered;
    wherein the motion detector triggers the image capturing device;
    wherein the image capturing device triggers the face detection module when an image is captured;
    wherein the face detection module triggers the liveness detection module when a face is detected in an image;
    wherein the liveness detection module triggers the biometric analyzer when the liveness detection module determines that a face present in front of the computing device is alive;
    wherein the image capturing device is deactivated after an image is captured;
    wherein the face detection module is deactivated after it determines whether or not a face is present in an image;
    wherein the liveness detection module is deactivated after it determines whether or not a face present in front of the computing device is alive;
    wherein the biometric analyzer is deactivated after it identifies any person present in front of the computing device.

2. A touch-free system for regulating access to a computing device, comprising:
    a motion detector;
    an image capturing device, wherein the image capturing device is configured to capture images;
    a face detection module, wherein the face detection module is configured to analyze images captured by the image capturing device, wherein the face detection module is configured to determine if at least one human face is present in an image captured by the image capturing device;
    a liveness detection module, wherein the liveness detection module is configured to determine if a face present in front of the computing device is alive;
    a biometric analyzer, wherein the biometric analyzer is configured to identify any person present in front of the computing device;
    a memory storing a biometric representation of at least one authorized user;
    at least one USB port;
    wherein the motion detector operates whether the computing device is locked or unlocked;
    wherein the computing device is locked and the at least one USB port is disconnected whenever the biometric analyzer detects that at least one of the people in front of the computing device is not an authorized user;
    wherein the computing device is unlocked and the at least one USB port is connected whenever the biometric analyzer detects that all of the people in front of the computing device are authorized users;
    wherein the image capturing device, face detection module, liveness detection module, and biometric analyzer are deactivated until they are triggered;
    wherein the motion detector triggers the image capturing device;
    wherein the image capturing device triggers the face detection module when an image is captured;
    wherein the face detection module triggers the liveness detection module when a face is detected in an image;
    wherein the liveness detection module triggers the biometric analyzer when the liveness detection module determines that a face present in front of the computing device is alive;
    wherein the image capturing device is deactivated after an image is captured;
    wherein the face detection module is deactivated after it determines whether or not a face is present in an image;
    wherein the liveness detection module is deactivated after it determines whether or not a face present in front of the computing device is alive;
    wherein the biometric analyzer is deactivated after it identifies any person present in front of the computing device.

3. A method for regulating access to a computing device, comprising:
    storing a biometric representation for at least one authorized user;
    detecting motion near the computing device;
    activating an image capturing device when motion is detected;
    triggering the image capturing device to capture an image when motion is detected;
    deactivating the image capturing device after the image is captured;
    triggering a face detection module when an image is captured;

using the face detection module to detect whether or not a face is present in the image;
deactivating the face detection module;
triggering a liveness detection module when the face detection module determines that a face is present in the image;
using the liveness detection module to detect whether or not the face is alive;
deactivating the liveness detection module;
triggering a biometric analysis module when the liveness detection module detects that the face is alive;
using the biometric analysis module to identify any people in the image;
using the biometric analysis module to determine whether each person in the image is an authorized user;
deactivating the biometric analysis module after each person in the image is determined to be or not be an authorized user; and further comprising:
if each person in the image is an authorized user, and the computing device is disconnected from the Internet, connecting the computing device to the Internet;
if each person in the image is an authorized user, and the computing device is connected to the Internet, leaving the computing device connected to the Internet;
if at least one person in the image is not an authorized user, and the computing device is disconnected from the Internet, leaving the computing device disconnected from the Internet;
if at least one person in the image is not an authorized user, and the computing device is connected to the Internet, disconnecting the computing device from the Internet.

4. A method for regulating access to a computing device, wherein the computing device comprises at least one peripheral device, comprising:
storing a biometric representation for at least one authorized user;
detecting motion near the computing device;
activating an image capturing device when motion is detected;
triggering the image capturing device to capture an image when motion is detected;
deactivating the image capturing device after the image is captured;
triggering a face detection module when an image is captured;
using the face detection module to detect whether or not a face is present in the image;
deactivating the face detection module;
triggering a liveness detection module when the face detection module determines that a face is present in the image;
using the liveness detection module to detect whether or not the face is alive;
deactivating the liveness detection module;
triggering a biometric analysis module when the liveness detection module detects that the face is alive;
using the biometric analysis module to identify any people in the image;
using the biometric analysis module to determine whether each person in the image is an authorized user;
deactivating the biometric analysis module after each person in the image is determined to be or not be an authorized user; and
further comprising:
if each person in the image is an authorized user, and the at least one peripheral device is disconnected, connecting the computing device to the at least one peripheral device;
if each person in the image is an authorized user, and the at least one peripheral device is connected, leaving the computing device connected to the at least one peripheral device;
if at least one person in the image is not an authorized user, and the at least one peripheral device is disconnected, leaving the computing device disconnected from the at least one peripheral device;
if at least one person in the image is not an authorized user, and the at least one peripheral device is connected, disconnecting the computing device from the at least one peripheral device.

5. A method for regulating access to a computing device, wherein the computing device comprises at least one USB port, comprising:
storing a biometric representation for at least one authorized user;
detecting motion near the computing device;
activating an image capturing device when motion is detected;
triggering the image capturing device to capture an image when motion is detected;
deactivating the image capturing device after the image is captured;
triggering a face detection module when an image is captured;
using the face detection module to detect whether or not a face is present in the image;
deactivating the face detection module;
triggering a liveness detection module when the face detection module determines that a face is present in the image;
using the liveness detection module to detect whether or not the face is alive;
deactivating the liveness detection module;
triggering a biometric analysis module when the liveness detection module detects that the face is alive;
using the biometric analysis module to identify any people in the image;
using the biometric analysis module to determine whether each person in the image is an authorized user;
deactivating the biometric analysis module after each person in the image is determined to be or not be an authorized user; and further comprising:
if each person in the image is an authorized user, and the at least one USB port is disconnected, connecting the computing device to the at least one USB port;
if each person in the image is an authorized user, and the at least one USB port is connected, leaving the computing device connected to the at least one USB port;
if at least one person in the image is not an authorized user, and the at least one USB port is disconnected, leaving the computing device disconnected from the at least one USB port;
if at least one person in the image is not an authorized user, and the at least one USB port is connected, disconnecting the computing device from the at least one USB port.

* * * * *